US011156136B2

(12) United States Patent
Hase et al.

(10) Patent No.: US 11,156,136 B2
(45) Date of Patent: Oct. 26, 2021

(54) BREATHER DEVICE, AND SNOW REMOVAL MACHINE WITH BREATHER DEVICE

(71) Applicant: HONDA MOTOR CO., LTD., Tokyo (JP)

(72) Inventors: Yuki Hase, Wako (JP); Atsushi Moroi, Wako (JP); Taiga Takamine, Wako (JP); Kaku Okabe, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 16/641,662

(22) PCT Filed: Aug. 30, 2018

(86) PCT No.: PCT/JP2018/032101
§ 371 (c)(1),
(2) Date: Feb. 25, 2020

(87) PCT Pub. No.: WO2019/044963
PCT Pub. Date: Mar. 7, 2019

(65) Prior Publication Data
US 2020/0217230 A1 Jul. 9, 2020

(30) Foreign Application Priority Data
Sep. 1, 2017 (JP) ............................ JP2017-168825

(51) Int. Cl.
*B01D 45/12* (2006.01)
*F01M 13/00* (2006.01)
(Continued)

(52) U.S. Cl.
CPC ........ *F01M 13/00* (2013.01); *F02M 35/0226* (2013.01); *F02M 35/162* (2013.01); *E01H 5/098* (2013.01); *F01M 2013/0038* (2013.01)

(58) Field of Classification Search
CPC ...... B01D 45/08; B01D 50/002; B01D 45/16; B01D 45/12; F01M 13/0011; F01M 13/04;
(Continued)

(56) References Cited

U.S. PATENT DOCUMENTS

2004/0007204 A1* 1/2004 Tomita ................ F01M 13/021 123/311
2008/0011280 A1* 1/2008 Tawarada ............ F02M 35/104 123/572
(Continued)

FOREIGN PATENT DOCUMENTS

EP 2927442 10/2015
JP 09-310609 12/1997
(Continued)

OTHER PUBLICATIONS

Extended European Search Report for European Patent Application No. 18852685.9 dated Sep. 25, 2020.
(Continued)

*Primary Examiner* — John Kwon
(74) *Attorney, Agent, or Firm* — Amin, Turocy & Watson, LLP

(57) ABSTRACT

A breather device and a snow removal machine having the breather device have a casing into which blowby gas of an engine flows, an air suction port for letting out gas from the inside of the casing, and a gas-liquid separation mechanism for separating moisture contained in the blowby gas. The gas-liquid separation mechanism separates an inlet, which allows the blowby gas to flow in, and the air suction port by a predetermined distance, and has the air suction port positioned above a liquid path through which the moisture
(Continued)

flows. A gas path allows the blowby gas to flow from the inlet to the air suction port without passing through an air cleaner element.

11 Claims, 7 Drawing Sheets

(51) Int. Cl.

| | |
|---|---|
| ***F02M 35/022*** | (2006.01) |
| ***F02M 35/16*** | (2006.01) |
| *E01H 5/09* | (2006.01) |

(58) Field of Classification Search
CPC ... F01M 2013/0433; F01M 2013/0461; F01M 2013/0438
See application file for complete search history.

(56) References Cited

U.S. PATENT DOCUMENTS

2012/0017865 A1* 1/2012 Sugiyama ............ F01M 13/028
123/196 CP
2012/0312272 A1 12/2012 Kobayashi et al.
2015/0052862 A1 2/2015 Wakabayashi
2019/0277172 A1* 9/2019 Tada ........................ F02F 7/006
2020/0061510 A1* 2/2020 Tada .................. B01D 46/0006

FOREIGN PATENT DOCUMENTS

| | | |
|---|---|---|
| JP | 2005-048601 | 2/2005 |
| JP | 2005-120977 | 5/2005 |
| JP | 2007-332874 | 12/2007 |
| JP | 2012-255372 | 12/2012 |
| JP | 2014-101866 | 6/2014 |
| WO | 2013/129556 | 9/2013 |
| WO | 2013/179829 | 12/2013 |

OTHER PUBLICATIONS

International Search Report and Written Opinion for International Application No. PCT/JP2018/032101 dated Oct. 30, 2018, 14 pages.

* cited by examiner

BREATHER DEVICE, AND SNOW REMOVAL MACHINE WITH BREATHER DEVICE

TECHNICAL FIELD

The present invention relates to a breather device (breather apparatus) and a snow removal machine with the breather apparatus, which separate liquids included in blowby gas.

BACKGROUND ART

An engine (drive source) creates blowby gas, which is a mixture of exhaust gas and unburned gas, when being driven. Conventionally, work machines such as snow removal machines would expel this blowby gas into the atmosphere, but in recent years, there has been a demand to suitably process this blowby gas in the interest of preserving the environment.

For example, a breather mechanism (air cleaner) disclosed in Japanese Laid-Open Patent Publication No. 2005-120977 restricts exhaust into the atmosphere by circulating the blowby gas into the engine. Furthermore, this breather mechanism includes a labyrinthine structure and an air cleaner element in the flow path of the blowby gas, and is configured such that the liquid included in the blowby gas is captured and only air is circulated to the engine.

SUMMARY OF INVENTION

However, the breather apparatus disclosed in Japanese Laid-Open Patent Publication No. 2005-120977 has a problem that the manufacturing cost of the apparatus is increased due to being formed with a complex structure including the labyrinthine structure and air cleaner element. Furthermore, when snow removal work is performed, there is the possibility of a phenomenon such as freezing of the moisture sucked into the air cleaner element occurring, which reduces the filtering function.

The present invention has been devised in order to solve this type of problem, and has the object of providing a breather apparatus and a snow removal machine including this breather apparatus that are capable of favorably separating the liquid in blowby gas with a simple configuration, while realizing a low manufacturing cost.

In order to achieve this objective, the present invention is a breather apparatus comprising a flow portion through which blowby gas of an engine flows; a chassis into which the blowby gas that has flowed through the flow portion flows; an outflow opening through which gas flows out from inside the chassis; and a gas-liquid separation mechanism that separates moisture included in the blowby gas, wherein the gas-liquid separation mechanism separates the outflow opening and an inflow opening through which the blowby gas flows in from the flow portion from each other by a prescribed distance and has the outflow opening arranged farther upward than a fluid passage through which the moisture flows, and the gas-liquid separation mechanism includes a gas passage through which the blowby gas flows to the outlet opening from the inlet opening without passing through an air cleaner element.

According to the above, by arranging the outflow opening at a prescribed distance from the inflow opening and higher than the liquid passage, the breather apparatus favorably separates moisture included in the blowby gas that has flowed in from the inlet opening while this blowby gas reaches the outflow opening. In this way, moisture is prevented from entering into the outflow opening. Since the blowby gas flows through the gas passage without passing through an air cleaner element, the breather apparatus has a simple configuration that does not include an air cleaner element. In particular, since the snow removal work is performed in a snowy environment, very little dust is sucked in, and the breather apparatus loaded in the snow removal machine can favorably process the blowby gas without using an air cleaner element. As a result, the manufacturing cost is significantly reduced, and it is possible to realize high durability without a reduction in the filtering function.

In this case, it is preferable that the gas-liquid separation mechanism comprises an inflow gas-liquid separation mechanism that separates the moisture while the blowby gas is guided to the inside of the chassis from the flow section and an outflow gas-liquid separation mechanism that separates the moisture while the blowby gas is guided to the outlet opening from the chassis.

By including the inflow gas-liquid separation mechanism and the outflow gas-liquid separation mechanism, it is possible to separate the moisture at two stages and to more reliably prevent the moisture from entering into the outflow opening.

It is preferable that the inflow gas-liquid separation mechanism includes an inflow member that is provided between the flow portion and the chassis and guides the blowby gas from the flow portion to the inside of the chassis.

By including the inflow member, the breather apparatus can separate the moisture from the blowby gas in the inflow member while simplifying the connection between the flow portion and the chassis.

In addition to the above configuration, it is preferable that the inflow member includes a blocking wall that blocks the flow of the moisture to the outflow opening.

The blocking wall of the inflow member causes the gaseous component of the blowby gas to flow in a manner to pass over the blocking wall toward to the outflow opening. On the other hand, the moisture is captured by the blocking wall without passing over the blocking wall, to be more reliably separated.

The inflow member may include a guide space that is provided inside the chassis and causes the blowby gas to flow in a direction different from the direction in the gas passage that is toward the outflow opening.

Due to the guide space of the inflow member, it is possible to cause the blowby gas to temporarily flow in a direction differing from the direction in the gas passage toward the air outflow opening. In this way, even when the moisture flows in the same direction as the blowby gas and the blowby gas exiting through the guide space flows toward the outflow opening, it is possible to move the moisture while maintaining the flow direction in the guide space.

It is preferable that the inflow member includes a protruding portion that protrudes into the guide space and causes the blowby gas to flow out toward a wall portion that forms the guide space from the flow portion.

By causing the blowby gas to flow out from the protruding portion toward the wall portion forming the guide space, the breather apparatus can cause the moisture to stick to the wall portion, thereby making it possible to more favorably separate the moisture from the blowby gas.

Alternatively, it is preferable that the inflow member is attached to an outer side of the chassis and takes in external air and causes the external air to flow to the chassis along with the blowby gas, a flow space from the inflow opening to a through-hole that penetrates through the chassis is formed with a zigzag shape, and the liquid passage is in communication with the flow space.

Due to the inflow member attached to the outside of the chassis, the breather apparatus can separate the moisture from the blowby gas using the zigzag flow space, before the blowby gas flows in together with the external air into the chassis.

Here, the outflow gas-liquid separation mechanism may be a protruding portion having the outflow opening arranged at a position higher than a floor surface of the chassis.

By arranging the outflow opening at a position higher than the floor surface of the chassis due to the protruding portion, the breather apparatus can easily prevent the moisture from flowing into the outflow opening.

Furthermore, the gas-liquid separation mechanism may include a groove portion through which the moisture is discharged to the outside of the chassis.

By including the groove portion that discharges the moisture to the outside of the chassis, the breather apparatus can prevent the moisture from accumulating inside the chassis, thereby reducing the humidity inside the chassis.

Here, the gas-liquid separation mechanism can be configured such that the flow section is shaped as a pipe and protrudes from a floor portion of the chassis toward a ceiling portion and the inflow opening opposes the ceiling portion.

By having the configuration in which the inflow opening of the flow portion opposes the ceiling portion of the ceiling portion, the breather apparatus causes the blowby gas that has been ejected to the chassis from the inflow opening to hit the ceiling portion such that the moisture therein sticks to the ceiling wall. In other words, the moisture can be separated from the blowby gas.

Yet further, the chassis may include an intake opening that takes in external air, mix the external air with the blowby gas, and guide the resulting mixed gas to the outflow opening.

By mixing together the blowby gas and the external air taken into the chassis and guiding this mixed gas to the air outflow opening, the breather apparatus can stably supply oxygen while circulating the blowby gas in the engine.

In order to realize the objective described above, a snow removal machine according to the present invention includes the breather apparatus described above and the engine.

By including the breather apparatus and the engine, the snow removal machine can favorably perform work in a low-temperature environment without discharging blowby gas to the outside.

According to the present invention, the breather apparatus and the snow removal machine including the breather apparatus can favorably separate liquid from blowby gas using a simple configuration, and can realize a reduced manufacturing cost.

DESCRIPTION OF EMBODIMENTS

The following describes preferred embodiments of a breather apparatus and a snow removal machine including this breather apparatus according to the present invention, while referencing the accompanying drawings.

First Embodiment

Figure 1:
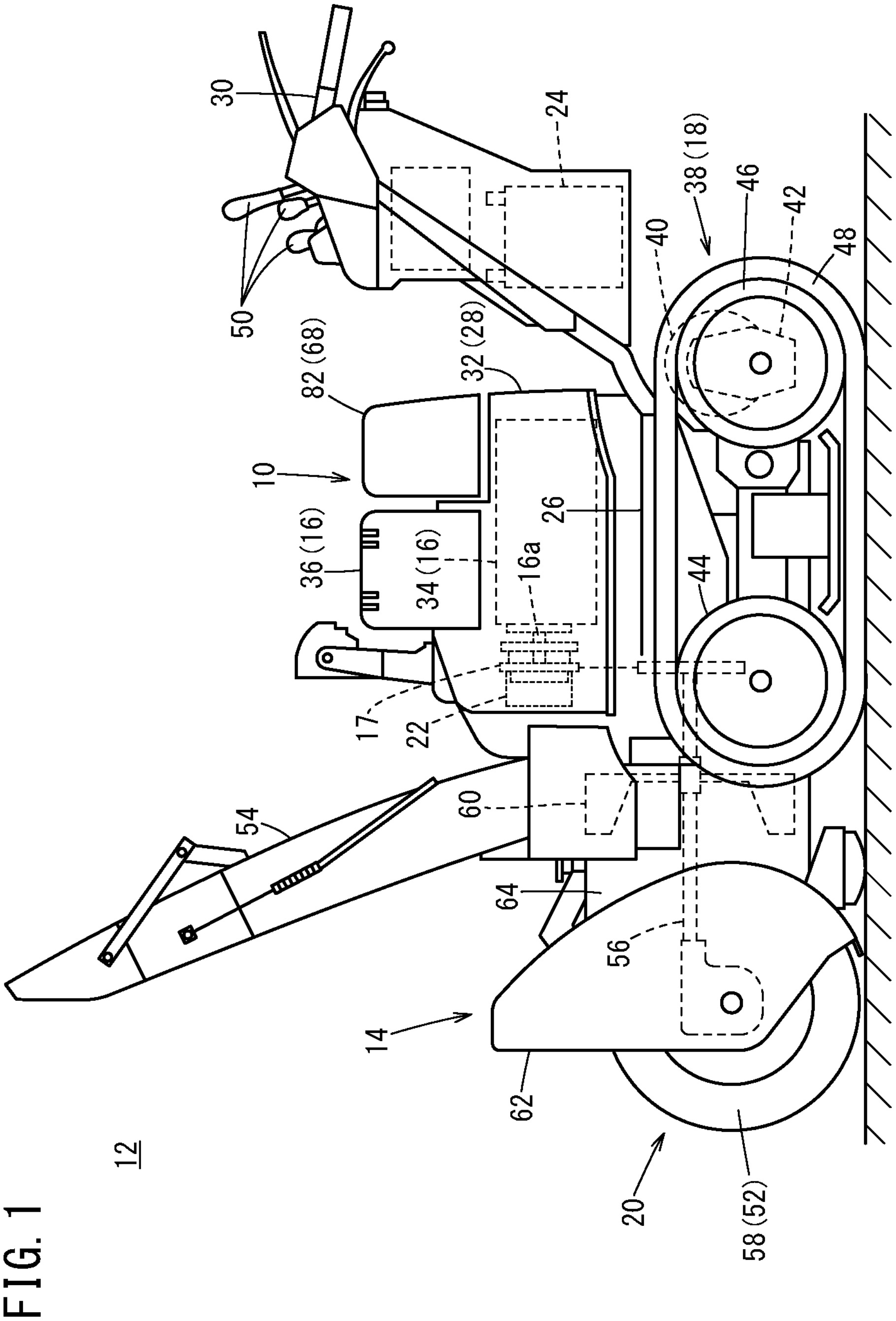
FIG. 1 is a side view of a snow removal machine in which the breather apparatus according to a first embodiment of the present invention is loaded.

As shown in FIG. 1, a breather apparatus 10 according to a first embodiment of the present invention is loaded in a snow removal machine 12, which is a work machine. This breather apparatus 10 has a function to process blowby gas generated by the drive of an engine 16 of the snow removal machine 12 and circulate this gas into the intake system of the engine 16. The work machine into which the breather apparatus 10 according to the present invention is loaded is not limited to the snow removal machine 12, and may be various devices such as tillage machines, generators, mowers, lawn mowers, pumps, and electric carts.

The snow removal machine 12 includes, in addition to the breather apparatus 10, a machine body 14, the engine 16 provided inside the machine body 14, a travel unit 18 that runs below the machine body 14, and a snow removal section 20 that actually removes snow from in front of the machine body 14. Furthermore, the snow removal machine 12 according to the present embodiment is provided with a power generator 22 that generates power based on the driving of the engine 16 and a battery 24 that accumulates power of the power generator 22 and provides this power to various electric and electronic components.

The machine body 14 of the snow removal machine 12 includes a frame 26 and a cover 28 that is secured to the frame 26. The frame 26 forms the overall frame structure of the snow removal machine 12. The rear portion of the frame 26 extends diagonally upward and acts as a handle 30 that is gripped by the user. The cover 28 forms the outer appearance of the snow removal machine 12, by being assembled with various boards. For example, the cover 28 includes an engine cover 32 that covers an engine body 34, which is described further below.

The engine 16 secured to the machine body 14 includes the engine body 34 and a fuel tank 36 that is arranged in the top portion of the engine body 34 (engine cover 32). The engine body 34 is a drive source for driving the snow removal machine 12, and is a widely known 4-cycle single-cylinder engine that uses gasoline as fuel, for example. Furthermore, the engine body 34 is provided with a cooling fan (not shown in the drawings) that cools the engine body 34.

The travel unit 18 is formed by a left and right pair of caterpillar mechanisms 38 that operate based on the power supplied from the power generator 22 or the battery 24. Each caterpillar mechanism 38 includes a motor 40, a decelerator 42 that adjusts the rotational velocity of the motor 40, front driven wheels 44 and rear driven wheels 46 that rotate based on the drive force transmitted from the decelerator 42, and a crawler belt 48 that is wound around the driven wheels 44 and 46. Each motor 40 is provided with power from the battery 24 to rotate, by having a manipulation portion 50 provided near the handle 30 manipulated by the user. The rotational drive power of each motor 40 is transmitted to the crawler belt 48 via the decelerator 42, the front driven wheels 44 and the rear driven wheels 46. In this way, the pair of right and left caterpillar mechanisms 38 are independently driven to realize directional movement (directional change) of the snow removal machine 12 in a forward, backward, or sideways (left and right) direction.

The snow removal section 20 includes an auger portion 52 that rakes in snow and a shooter portion 54 that blows out the snow raked in by the auger portion 52 in a prescribed direction. The auger portion 52 is provided below the machine body 14 and in front of the travel unit 18, and includes a drive shaft 56 that is connected to an output shaft 16*a* of the engine 16 via an electromagnetic clutch portion 17 and the like. Furthermore, the auger portion 52 includes an auger 58 and a blower 60 that turns based on the rotation of the drive shaft 56, and the cover 28 includes an auger housing 62 that partially covers the rear of the auger 58 and a blower housing 64 that completely covers the blower 60 behind the auger housing 62.

The snow removal machine 12 described above provides the travel unit 18 with power from the power generator 22 or the battery 24 by having the user drive the engine body 34, and also drives the snow removal section 20 with the drive shaft 56 of the engine body 34. During the snow removal work, the user manipulates the handle 30 and the manipulation portion 50 to move the travel unit 18 (forward, backward, directional change). When the machine body 14 progresses forward, the snow removal machine 12 rakes up the snow present in front of the auger portion 52 with the auger 58, lifts up the raked snow with the blower 60, and shoots out the snow through the shooter portion 54.

Here, while being driven, the blowby gas including the mixed gas of exhaust gas and unburned gas, piston lubrication oil, and the like is generated inside the engine body 34 of the snow removal machine 12. As described above, the breather apparatus 10 is attached to the engine 16 in order to circulate this blowby gas to the engine body 34.

Figure 2:
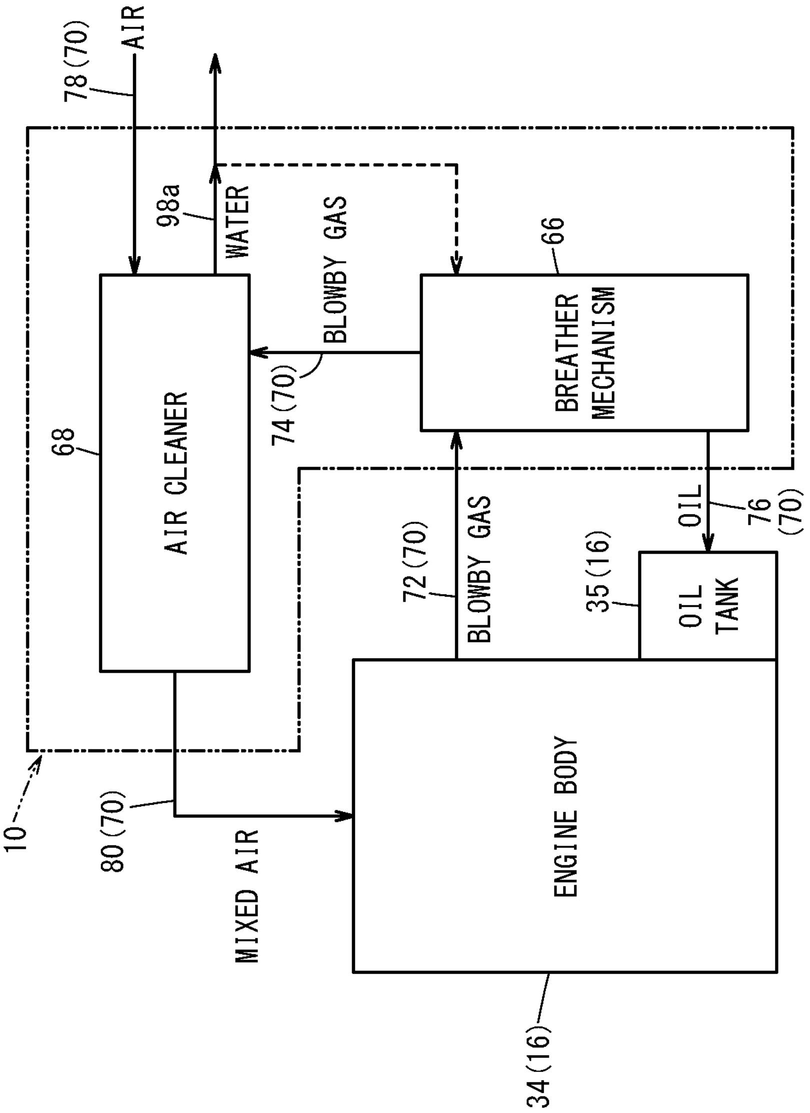
FIG. 2 is a block diagram schematically showing functional sections of the breather apparatus of FIG. 1.

As shown in FIG. 2, the breather apparatus 10 includes a breather mechanism 66 that cools the blowby gas and an air cleaner 68 that causes the gaseous component of the blowby gas to flow to the intake system. Furthermore, the breather apparatus 10 includes a plurality of pipes 70 (flow portion) through which the fluid such as the blowby gas flows.

The plurality of pipes 70 include a first flow pipe 72 that provides a connection between the engine body 34 and the breather mechanism 66 and a second flow pipe 74 that provides a connection between the breather mechanism 66 and the air cleaner 68. A first flow path (not shown in the drawings) that connects a crank chamber of the engine body 34 and the inside of the breather mechanism 66 is provided inside the first flow pipe 72. A second flow path 74*a* (see FIG. 3) that connects the inside of the breather mechanism 66 and the inside of the air cleaner 68 is provided inside the second flow pipe 74. Furthermore, the plurality of pipes 70 include an oil flow pipe 76 that provides a connection between the breather mechanism 66 and an oil tank 35 of the engine body 34, an air acquisition pipe 78 that takes outside air into the air cleaner 68, and an air intake pipe 80 that provides a connection between the air cleaner 68 and the intake system of the engine 16.

The breather mechanism 66 separates out the oil included in the blowby gas, by cooling the blowby gas passing through the first flow pipe 72. The structure of this type of breather mechanism 66 is not particularly limited, and a variety of structures can be adopted. For example, the breather mechanism 66 can adopt a structure (not shown in the drawings) that includes a capturing portion that cools the space through which the blowby gas flows and also captures oil in this space. Alternatively, the breather mechanism 66 can adopt a structure that cools a tube including the blowby gas flow path and causes oil to flow into a branch tube. In the breather mechanism 66, the oil that has been separated from the blowby gas is returned to the oil tank 35 of the engine body 34 via the oil flow pipe 76, thereby being reused in the lubrication oil of the piston of the engine body 34.

Figure 3:
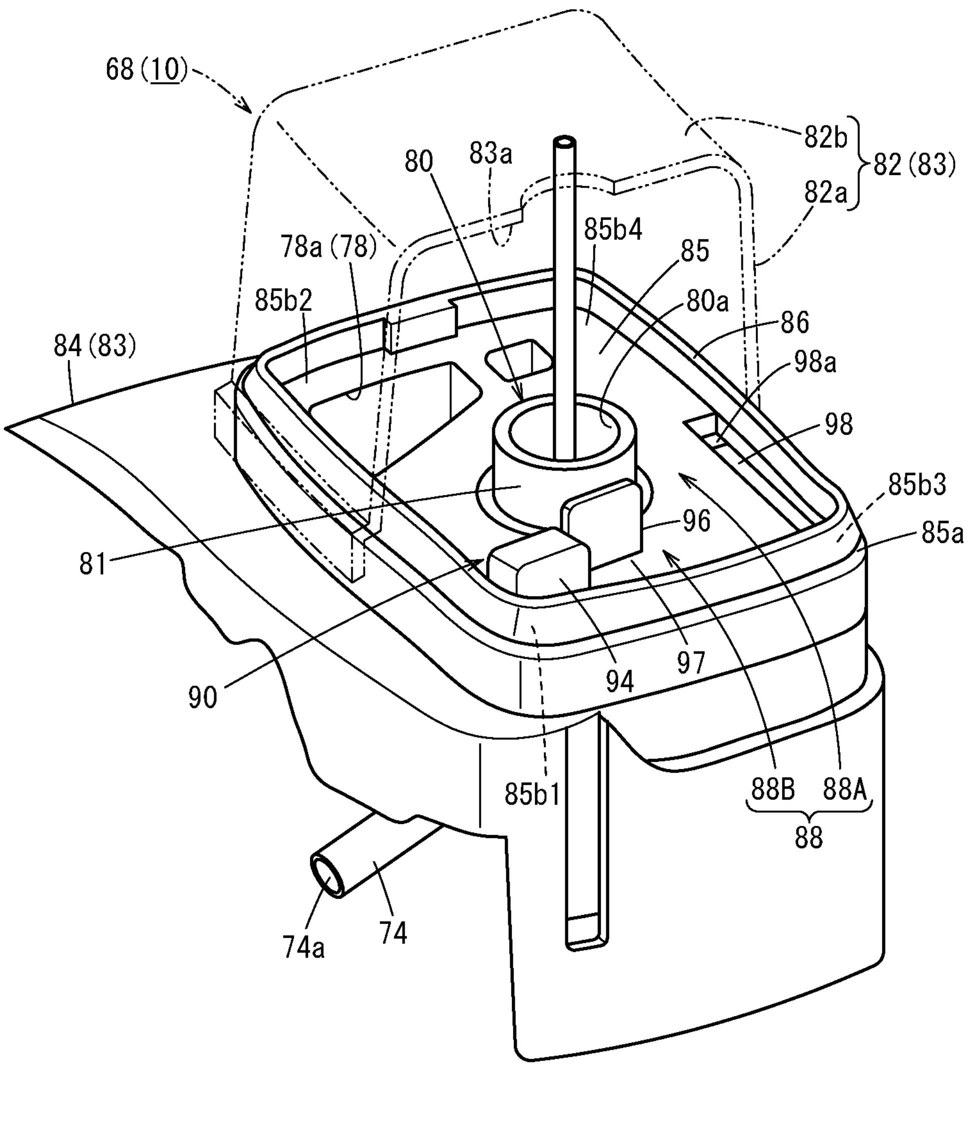
FIG. 3 is a partial cross-sectional perspective view in which a portion of the air cleaner of FIG. 1 is blown away.

As shown in FIGS. 1 to 3, the air cleaner 68 of the breather apparatus 10 is arranged above the engine body 34 (engine cover 32) and the breather mechanism 66. By assembling a case 82 and a base 84, a chassis 83 of the air cleaner 68 is formed at a position distanced from the engine cover 32. The inside of the chassis 83 is formed to have a prescribed volume, and creates an internal space 83*a* through which the blowby gas and external air flows.

The case 82 is formed with a substantially rectangular shape, and includes side walls 82*a* on four sides surrounding a space to the front, back, left, and right and a ceiling wall 82*b* that is connected to the top portion of each side wall 82*a* and forms the ceiling. On the other hand, a fixed surface portion 85 that is connected to and fixed to the bottom end portion of the case 82 is provided on the top portion of the base 84. This fixed surface portion 85 is formed with a rectangular shape in a planar view, and the bottom end portion of the case 82 (side walls 82*a*) is fixed to an edge portion 85*a* of the fixed surface portion 85. Furthermore, a seal member 86 is provided for the base 84 inside the edge portion 85*a* along the border between the base 84 and the case 82. The seal member 86 prevents the blowby gas from leaking outside from the internal space 83*a*.

Figure 5:
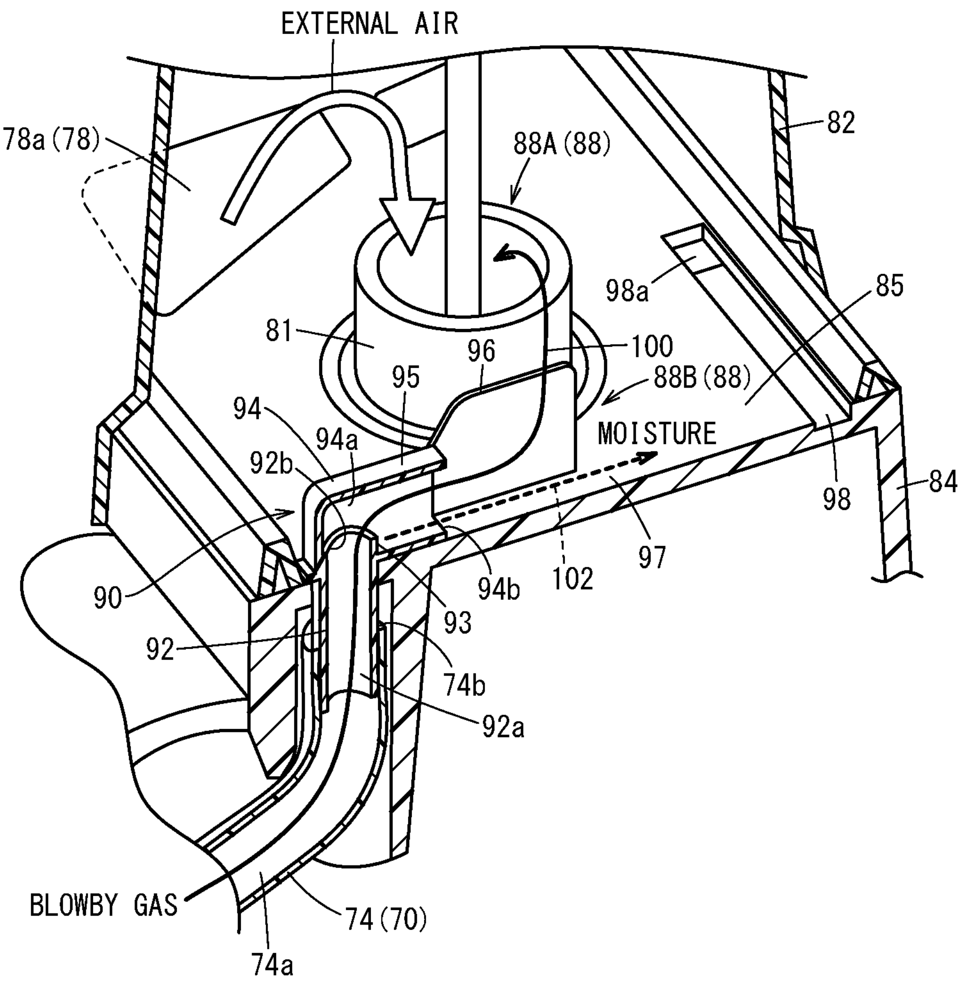
FIG. 5 is a partial cross-sectional perspective view of the flow of blowby gas in the breather apparatus.

The second flow pipe 74 (pipe 70: flow portion) that guides the blowby gas to the air cleaner 68 extends upward from the breather mechanism 66 and connects to an inflow member 90 provided on the base 84 (see also FIG. 5). The inflow member 90 is arranged at a position near a prescribed corner (referred to below as a first corner 85*b*1) inside the edge portion 85*a* on the fixed surface portion 85. The configuration of the inflow member 90 is described in detail further below.

The air acquisition pipe 78 according to the present embodiment is formed integrally with the base 84. The air acquisition pipe 78 includes an air acquisition opening 78*a* with a prescribed shape (trapezoid shape in FIG. 3) that is connected to the internal space 83*a*, in a planar view. The air acquisition opening 78*a* is arranged at a position near a corner (referred to below as a second corner 85*b*2) of the fixed surface portion 85 differing from the first corner 85*b*1. The air acquisition pipe 78 extends along a path (not shown in the drawings) inside the base 84, and has, at an end opposite the air acquisition opening 78*a*, an opening (not shown in the drawings) that opens to the outside of the machine body 14.

Furthermore, the air intake pipe 80 according to the present embodiment is assembled together with the base 84 using stack bolts or the like, and is fixed to a center portion of the fixed surface portion 85. The air intake pipe 80 includes a protruding portion 81 that penetrates through the base 84 and protrudes a short distance upward from the fixed surface portion 85 and an air intake opening 80*a* (outflow opening) is formed in the protruding end of the protruding portion 81. The air intake pipe 80 extends downward inside the base 84 and an end portion of the air intake pipe 80 on the side opposite the protruding portion 81 is connected to an intake manifold (not shown in the drawings) of the engine body 34. The intake manifold has an intake path in which an intake valve (not shown in the drawings) is provided. A carburetor (not shown in the drawings) is provided at a location where the intake manifold connects to the air intake pipe 80.

Basically, the blowby gas flows into the internal space 83*a* of the air cleaner 68 via the second flow pipe 74, and external air flows into the internal space 83*a* from the outside via the air acquisition pipe 78. In the internal space 83*a*, the blowby gas and the external air are mixed together to create mixed air, and this mixed air flows through the air intake pipe 80.

Here, the blowby gas is mixed with moisture due to reasons such as flowing through the breather mechanism 66. Therefore, the breather apparatus 10 according to the present embodiment includes a gas-liquid separating mechanism 88 that removes the moisture from the blowby gas that flows through the air cleaner 68. This gas-liquid separating mechanism 88 is formed by an outflow gas-liquid separating mechanism 88A that performs separation at a stage where the air flows out from the air cleaner 68 and an inflow gas-liquid separating mechanism 88B that performs separation at a stage where the blowby gas flows into the air cleaner 68. More specifically, the outflow gas-liquid separating mechanism 88A is formed by the air intake pipe 80 and the protruding portion 81 described above. On the other hand, the inflow gas-liquid separating mechanism 88B includes an inflow member 90 attached to the base 84 and a groove portion 98 formed in the base 84.

The inflow member 90 is a port that allows the blowby gas to flow into the internal space 83*a* of the base 84. The inflow member 90 includes a joint portion 92 (see FIG. 5) that is connected to the second flow pipe 74, a guide box portion 94 that is connected to the top portion of the joint portion 92 and extends in a lateral direction, and a blocking wall 96 that is connected to an end portion of the guide box portion 94 and stands upright from the base 84.

The joint portion 92 is formed with a cylindrical shape having a prescribed protrusion length and, when the breather apparatus 10 is assembled, protrudes downward penetrating through the fixed surface portion 85 (base 84). An end portion of the second flow pipe 74 is firmly fixed to the outer circumferential surface of the joint portion 92 protruding inward of the base 84. In other words, an inlet opening 74*b* that is provided at an end portion of the second flow pipe 74 and guides the blowby gas to the air cleaner 68 is substantially positioned on the joint portion 92 of the inflow member 90. An inlet path 92*a* that is in communication with the second flow path 74*a* is formed inside the joint portion 92. The top portion of the inlet path 92*a* is in communication with the guide box portion 94.

The guide box portion 94 is formed with a substantially rectangular shape having rounded corners, stands extending upward from the fixed surface portion 85, and extends a short distance along the lateral direction from the first corner 85*b*1 (surface direction of the fixed surface portion 85). A guide space 94*a* having a prescribed flow path cross-sectional area (e.g. a flow path cross-sectional area approximately equal to that of the inlet path 92*a*) is formed inside the guide box portion 94.

Figure 4:
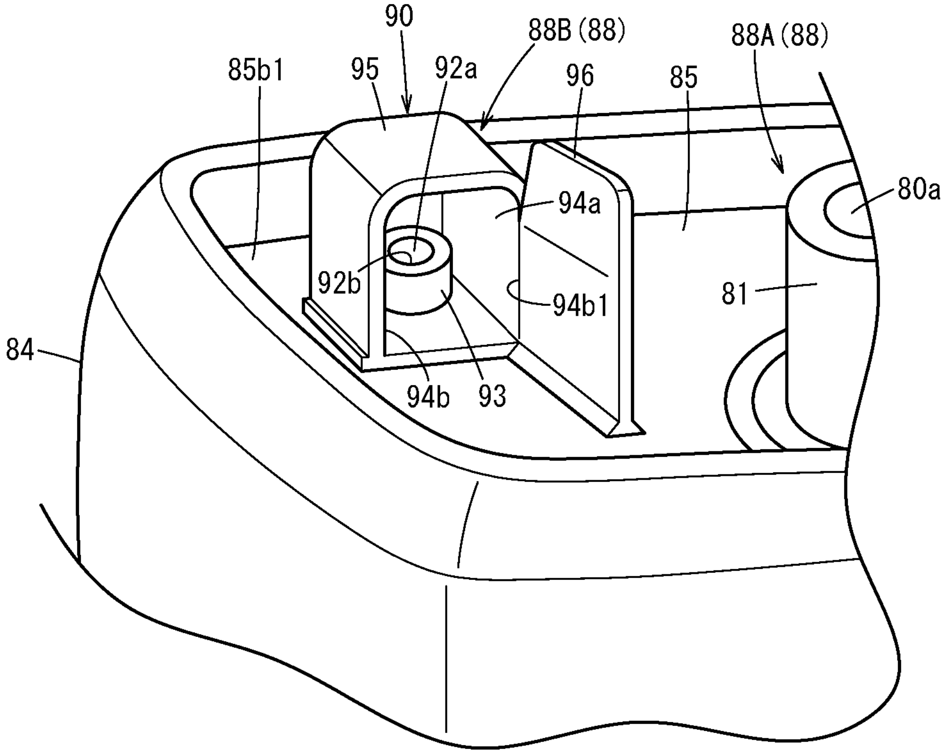
FIG. 4 is an enlarged perspective view of the inflow member of FIG. 3.

As shown in FIG. 4, the guide space 94*a* of the guide box portion 94 extends in the lateral direction along the shape of the guide box portion 94 and is in communication with an open portion 94*b* that opens in the lateral direction. The guide box portion 94 includes a shroud 95 (wall portion) that forms the ceiling of the guide space 94*a*, and the guide space 94*a* has a rectangular shape that is long in the up-down direction, in a cross-sectional view orthogonal to the extension direction of the guide box portion 94.

A cylindrical protruding portion 93 that protrudes upward from the bottom surface of the guide box portion 94 is formed in a deep portion (near the first corner 85*b*1) of the guide box portion 94. This protruding portion 93 is formed having the same thickness as the joint portion 92, and the inlet path 92*a* penetrates therethrough along the axial direction. The protruding portion 93 protrudes upward inside the guide space 94*a* and the communication opening 92*b* at the protruding end portion approaches the shroud 95, thereby causing the blowby gas to flow out toward the shroud 95. The distance of the communication opening 92*b* of the protruding portion 93 and the shroud 95 depends on the ejection strength of the blowby gas, and may be set to be slightly longer than or approximately equal to the diameter of the inlet path 92*a*, for example.

The blocking wall 96 is continuous with an open edge portion 94*b*1 closest to the air intake pipe 80 (center of the fixed surface portion 85) among the open edge portions forming the open portion 94*b* of the guide box portion 94. This blocking wall 96 forms an obstacle that has to be passed over, when the blowby gas that has flowed out from the open portion 94*b* flows through the air intake opening 80*a*. One surface side of the blocking wall 96 forms a cavity 97 that is in unobstructed communication with the open portion 94*b* between said one surface side of the blocking wall 96 and the side walls 82*a* of the case 82. Furthermore, the other surface side of the blocking wall 96 faces the protruding portion 81 of the air intake pipe 80.

More specifically, the blocking wall 96 extends a prescribed length along the lateral direction (the extension direction of the guide box portion 94). For example, the length of the blocking wall 96 in the lateral direction is greater than the length of the guide box portion 94 in the lateral direction, and an end portion of the blocking wall 96 on the lateral side is positioned beyond the center of the protruding portion 81 of the air intake pipe 80 closer to the corner (third corner 85*b*3) on the opposite side of the first corner 85*b*1. Furthermore, the blocking wall 96 is designed to be higher than the protrusion height of the guide box portion 94 of the inflow member 90 and the protruding portion 81 of the air intake pipe 80.

The inflow member 90 formed in the manner described above causes the flow path of the blowby gas to curve significantly therein, thereby causing the moisture in the blowby gas to stick to the inner walls of the flow path and making it possible to encourage the separation of the moisture from the gaseous component (air). Specifically, the gaseous component of the blowby gas that has flowed from the open portion 94*b* of the inflow member 90 travels along a gas passage 100 that goes upward in a manner to pass over the air intake opening 80*a* and the blocking wall 96 while flowing through the cavity 97. On the other hand, the moisture in the blowby gas follows, in the cavity 97, a liquid passage 102 that is on the fixed surface portion 85 and progresses in the lateral direction without passing over the blocking wall 96.

Since the inlet opening 74*b* of the second flow pipe 74 and the air intake opening 80*a* of the air intake pipe 80 are arranged at a sufficient distance from each other and the air intake opening 80*a* is arranged farther upward than the liquid passage 102, the moisture is more reliably prevented from entering into the air intake opening 80*a*. Furthermore, the internal space 83*a* of the air cleaner 68 is not provided with an air cleaner element as in the conventional art.

Therefore, the gas passage 100 can realize a smooth flow through the internal space 83*a*. The distance between the inlet opening 74*b* and the air intake opening 80*a* is not particularly limited, but is preferably a longer distance than the diameter of the air intake opening 80*a*, for example.

Returning to FIG. 3, the groove portion 98 of the gas-liquid separating mechanism 88 (inflow gas-liquid separating mechanism 88B) is formed along the inside of the edge portion 85*a* of the base 84. The floor surface at one end portion of the groove portion 98 is provided with an opening of a water discharge path 98*a*. The water discharge path 98*a* is formed as a prescribed path inside the base 84, and the groove portion 98 discharges the moisture by causing the moisture that has flowed through the liquid passage 102 to flow through the water discharge path 98*a*. In a case where the breather mechanism 66 is a water cooling type, the water discharge path 98*a* may have a configuration in which the moisture circulates as shown by the dotted line in FIG. 2.

The protruding portion 81 that forms the outflow gas-liquid separating mechanism 88A is formed to be higher than the fixed surface portion 85 at a position distanced from the blocking wall 96 of the inflow member 90, thereby forming a separate obstacle that cannot be passed over by the moisture. Specifically, the gas-liquid separating mechanism 88 according to the present embodiment realizes separation of the moisture from the gaseous component at two stages, which are the outflow gas-liquid separating mechanism 88A and the inflow gas-liquid separating mechanism 88B. In this way, it is possible to more reliably prevent the moisture from entering into the air intake opening 80*a*.

The following describes the effect of the breather apparatus 10 and the snow removal machine 12 having the configuration described above.

When using the snow removal machine 12 in which the breather apparatus 10 is loaded, the engine 16 is driven based on a manipulation made by the user. In this way, the snow removal machine 12 performs the snow removal work. As shown in FIG. 2, the engine body 34 generates the blowby gas while being driven, and the breather apparatus 10 performs processing of this blowby gas.

Specifically, the blowby gas flows to the breather mechanism 66 from the engine body 34, via the first flow pipe 72. By performing cooling with the breather mechanism 66, the oil included in the blowby gas is separated. This oil is discharged from the breather mechanism 66 and flows to the oil tank 35 through the oil flow pipe 76.

Furthermore, the blowby gas flows to the air cleaner 68 from the breather mechanism 66, via the second flow path 74*a* of the second flow pipe 74. At this time, the blowby gas is cooled by the breather mechanism 66 and, as shown in FIG. 5, is moved from the second flow path 74*a* (inlet opening 74*b*) to the inlet path 92*a* of the inflow member 90 in a state including moisture.

As described above, the inflow member 90 forms the gas-liquid separating mechanism 88 and separates the moisture from the blowby gas that flows therethrough. Specifically, the blowby gas is ejected from the inlet path 92*a* (protruding portion 93) toward the guide space 94*a* and contacts the shroud 95 inside the guide box portion 94. Therefore, the moisture sticks to the wall surface of the guide box portion 94, thereby being separated from the gaseous component.

The gaseous component of the blowby gas progresses in the lateral direction within the guide box portion 94 (a direction orthogonal to the protrusion direction of the joint portion 92 and the protruding portion 81) and, after flowing to the cavity 97 from the open portion 94*b* of the inflow member 90, flows through the gas passage 100 of the internal space 83*a*. Here, in the air cleaner 68, the air intake opening 80*a* of the air intake pipe 80 is arranged at a position higher than the fixed surface portion 85 of the base 84. Therefore, the gas passage 100 draws a flow line that expands upward from the internal space 83*a* and flows at a position higher than the blocking wall 96. Furthermore, since reaching the air intake opening 80*a* without passing through the air cleaner element, the gas passage 100 can encourage the circulation in the internal space 83*a*.

On the other hand, the moisture of the blowby gas flows in the lateral direction inside the guide box portion 94 and flows out from the open portion 94*b* to the cavity 97, and then progresses through the liquid passage 102 on the fixed surface portion 85. In other words, the moisture is prevented from passing over the blocking wall 96, and instead flows into the groove portion 98 of the base 84 and then flows out to the water discharge path 98*a* through the groove portion 98.

Furthermore, external air flows into the internal space 83*a* of the air cleaner 68 via the air acquisition pipe 78. Therefore, in the internal space 83*a*, the gaseous component of the blowby gas and the external air taken in are mixed together to form the mixed air, and this mixed air flows into the air intake opening 80*a*. The mixed air flows into the intake system of the engine body 34 through the air intake pipe 80, and is used for combustion in the engine 16.

As described above, the breather apparatus 10 and the snow removal machine 12 according to the present invention realize the effects described below.

Since the air intake opening 80*a* is arranged farther upward than the liquid passage 102 and at a prescribed distance from the inlet opening 74*b*, the breather apparatus 10 favorably separates moisture included in the blowby gas that has flowed in from the inlet opening 74*b* while this blowby gas reaches the air intake opening 80*a*. In this way, moisture is prevented from entering into the air intake opening 80*a*. Since the blowby gas flows through the gas passage 100 without passing through an air cleaner element, the breather apparatus 10 has a simple configuration that does not include an air cleaner element. In particular, since the snow removal work is performed in a snowy environment, very little dust is sucked in, and the breather apparatus 10 loaded in the snow removal machine 12 can favorably process the blowby gas without using an air cleaner element. As a result, the manufacturing cost is significantly reduced, and it is possible to realize high durability without a reduction in the filtering function.

Furthermore, by including the inflow member 90, the breather apparatus 10 can separate the moisture from the blowby gas in the inflow member 90 while simplifying the connection between the second flow pipe 74 (pipe 70) and the base 84. In this case, the blocking wall 96 of the inflow member 90 causes the blowby gas to flow in a manner to pass over the blocking wall 96 toward to the air intake opening 80*a*. On the other hand, the moisture sticks to (is captured by) the blocking wall 96 without passing over the blocking wall 96, to be more reliably separated. Furthermore, due to the inlet path 92*a* and the guide space 94*a*, the inflow member 90 can cause the blowby gas to temporarily flow in a direction differing from the direction in the gas passage 100 that heads toward the air intake opening 80*a*. In this way, even when the moisture flows in the same direction as the gaseous component and the gaseous component exiting through the guide space 94*a* flows toward the air intake opening 80*a*, it is possible to move the moisture while maintaining the flow direction in the guide space 94*a*.

By including the groove portion 98 that discharges the moisture to the outside of the base 84, the breather apparatus 10 can prevent the moisture from accumulating inside the base 84, thereby reducing the humidity inside the base 84. By mixing together the blowby gas and the external air taken into the base 84 and guiding this mixed gas to the air intake opening 80*a*, the breather apparatus 10 can stably supply oxygen while circulating the blowby gas into the engine 16.

By including the breather apparatus 10 and the engine 16, the snow removal machine 12 can favorably perform work in a low-temperature environment without discharging blowby gas to the outside.

The present invention is not limited to the embodiments described above, and it is possible to make various alterations in line with the spirit of the present invention. For example, if the air intake opening 80*a* is positioned above the liquid passage 102 in the breather apparatus 10, the inflow member 90 does not need to include the blocking wall 96.

The following describes other embodiments (second and third embodiments) of the breather apparatus according to the present invention. In the following description, configurations that are the same as or has the same function as those in the breather apparatus 10 or the snow removal machine 12 according to the first embodiment are given the same reference numerals, and detailed descriptions thereof are omitted.

Second Embodiment

Figure 6:
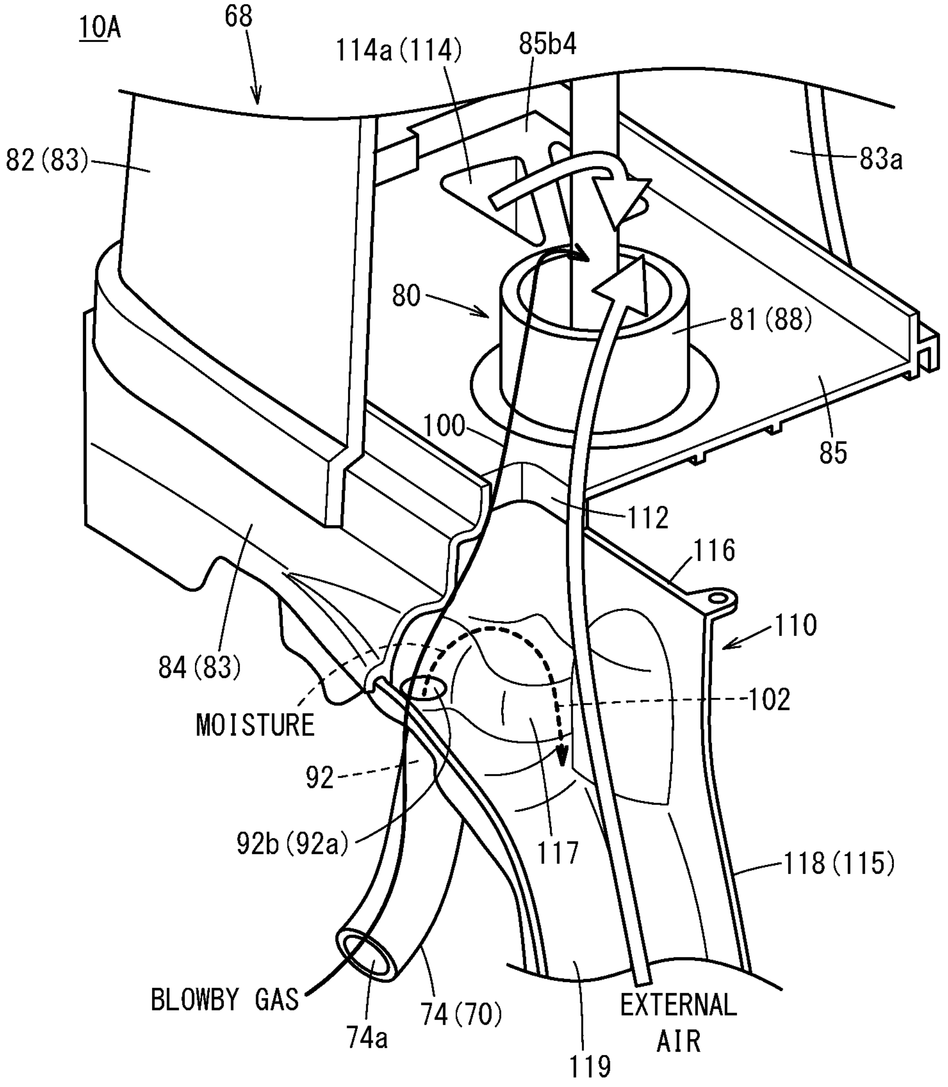
FIG. 6 is a partial cross-sectional perspective view in which a portion of an air cleaner of a breather apparatus according to a second embodiment of the present invention is blown away.

As shown in FIG. 6, the breather apparatus 10A according to the second embodiment differs from the breather apparatus 10 according to the first embodiment in that an inflow member 110 that guides the blowby gas into the internal space 83*a* is provided on a bottom side of the base 84 of the air cleaner 68.

A through-hole 112 that penetrates through the fixed surface portion 85 and the back surface of the base 84 is provided near the first corner 85*b*1 (see FIG. 3) of the base 84. Furthermore, a first air acquisition pipe 114 (first air acquisition opening 114*a*) that takes air outside of the snow removal machine 12 into the internal space 83*a* is provided at a corner (fourth corner 85*b*4) opposite the first corner 85*b*1 in a manner to sandwich the center of the base 84 (air intake pipe 80). The first air acquisition pipe 114 is formed integrally with the base 84, in the same manner as in the breather apparatus 10A.

The inflow member 110 includes an attachment portion 116 that is fixed to the base 84, the joint portion 92 that is formed integrally on the back surface side of the attachment portion 116, and an air intake half-cylinder portion 118 that is formed integrally on one side of the attachment part 116.

The attachment portion 116 is formed with a bowl shape having a certain depth relative to the fixed surface portion 85. The joint portion 92 extends a short distance downward from the attachment portion 116, and the outer circumferential surface thereof is connected and fixed to the second flow pipe 74. An uneven portion with a prescribed shape is formed on the inner surface portion (bowl-shaped inner surface portion 117) of the attachment portion 116. Furthermore, the surface of the base 84 opposing the bowl-shaped inner surface portion 117 is formed to have a several steps.

The bowl-shaped inner surface portion 117 is formed to be larger than the planar shape of the through-hole 112, and the inlet path 92*a* of the joint portion 92 is in communication with a corner thereof. A distance greater than or equal to a certain amount in the height direction is formed from the communication opening 92*b* of the inlet path 92*a* to the through-hole 112 of the base 84. Specifically, a flow space formed between the base 84 and the bowl-shaped inner surface portion 117 causes the blowby gas to zigzag along the uneven portion and stepped portion. The blowby gas that has flowed in from the communication opening 92*b* contacts the uneven portion of the bowl-shaped inner surface portion 117 and the steps of the base 84 on its way to the through-hole 112, thereby separating the moisture from the gaseous component.

The air intake half-cylinder portion 118 is formed with a pipe (gutter) shape and is continuous with the bowl-shaped attachment portion 116, and includes a flow groove 119 therein. The air intake half-cylinder portion 118 extends downward at an incline toward the side of the engine 16, and the flow groove 119 also extends along the extension direction. By covering the flow groove 119 with the base 84, the air intake half-cylinder portion 118 is formed on the second air acquisition pipe 115 that takes in the air outside the snow removal machine 12. This flow groove 119 (second air acquisition pipe 115) has a function to cause the moisture separated from the blowby gas to flow along the pipe (gutter) shape and be discharged to the outside of the machine body 14.

The breather apparatus 10A according to the second embodiment is basically configured as described above, and the following describes the effects realized by the breather apparatus 10A. When the engine 16 is being driven, the breather apparatus 10A causes the blowby gas generated by the engine body 34 to flow to the joint portion 92 of the inflow member 110 from the second flow pipe 74. In the inflow member 110, the blowby gas contacts the uneven portion of the bowl-shaped inner surface portion 117, the steps of the base 84, and the like, thereby causing the moisture to be separated from the gaseous component.

The moisture that has been separated by the bowl-shaped inner surface portion 117 flows toward the air intake half-cylinder portion 118 (second air acquisition pipe 115) and is discharged to the outside of the air cleaner 68 through the flow groove 119. On the other hand, the gaseous component of the blowby gas progresses upward in the space inside the attachment portion 116 and mixes with the external air that has flowed in from the second air acquisition pipe 115, and this mixed gas flows into the through-hole 112. In other words, the blowby gas and the external air flow into the internal space 83*a* in a mixed state. In the internal space 83*a*, the external air that has flowed in from the first air acquisition pipe 114 is also mixed with the gas, and the resulting mixed air flows into the air intake pipe 80.

In the second embodiment as well, by having the protruding portion 81 of the air intake pipe 80 protrude from the fixed surface portion 85, the flow of moisture is restricted. Accordingly, even if moisture were still included in the blowby gas in the internal space 83*a*, it is possible to significantly reduce the moisture that passes over the protruding portion 81 and enters into the air intake pipe 80.

As described above, with the breather apparatus 10A according to the second embodiment as well, it is possible to realize the same effect as the breather apparatus 10 according to the first embodiment. In particular, this breather apparatus 10A separates the moisture from the blowby gas using the zigzag flow space, before the external air and blowby gas flow into the internal space 83*a* due to the inflow member 110. As a result, it is possible to more effectively prevent the moisture from entering into the air intake pipe 80.

Third Embodiment

Figure 7:
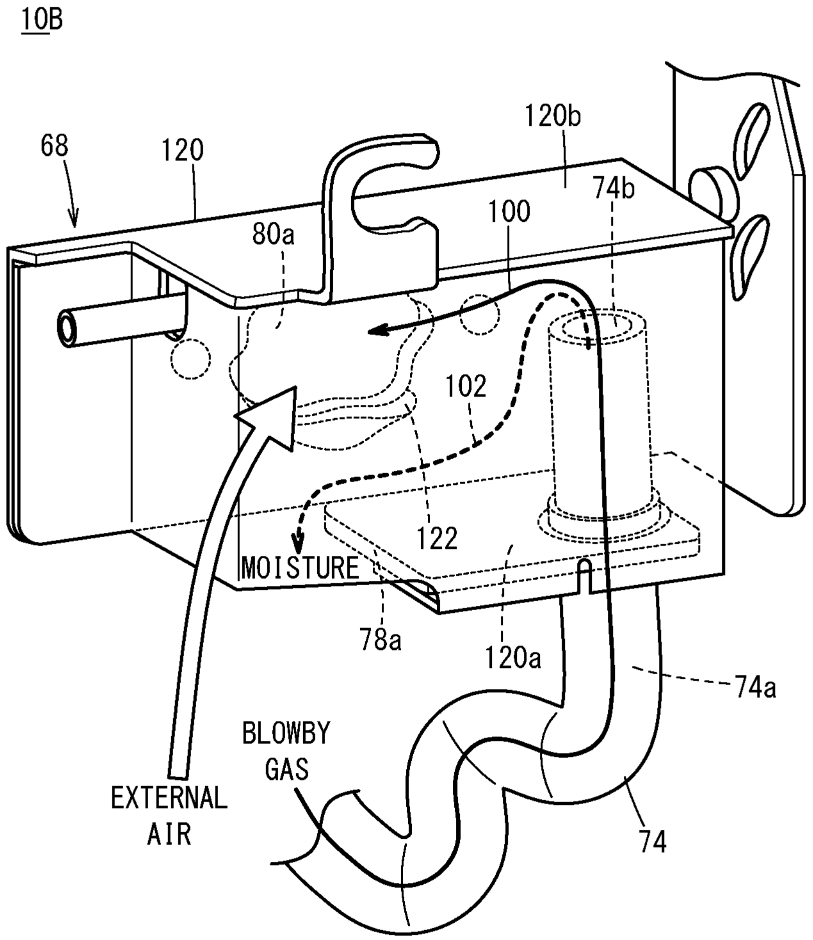
FIG. 7 is a perspective view of an air cleaner of a breather apparatus according to a third embodiment of the present invention.

As shown in FIG. 7, the breather apparatus 10B according to the third embodiment differs from the breather apparatuses 10 and 10A according to the first and second embodiments in that, in the chassis 120 of the air cleaner 68, the second flow pipe 74 (inlet opening 74*b*) protrudes to a certain height from the floor portion 120*a*, and is arranged at a distance from the air intake opening 80*a*.

Specifically, the chassis 120 is formed with a rectangular box shape. The second flow pipe 74 is inserted into and fixed to the floor portion 120*a* of the chassis 120. The floor portion 120*a* is shorter in the longitudinal direction than the ceiling portion 120*b* of the chassis 120, and the air acquisition opening 78*a* through which the external air flows is formed between the floor portion 120*a* and one side surface of the chassis 120. An air intake pipe (not shown in the drawings) is connected to the air acquisition opening 78*a*. Furthermore, the air intake opening 80*a* causes the mixed air to flow into the air intake pipe (not shown in the drawing) that is provided on the other side surface of the chassis 120. Yet further, a dividing wall 122 that divides the floor portion 120*a* from the air acquisition opening 78*a* is provided at the bottom portion of the air intake opening 80*a*.

The second flow pipe 74 protrudes upward from the floor portion 120*a* to a prescribed height, and the protruding end thereof (the inlet opening 74*b* of the second flow pipe 74) is arranged near the ceiling portion 120*b* of the chassis 120. The inlet opening 74*b* is arranged at a prescribed distance from the air intake opening 80*a*, thereby preventing the moisture included in the blowby gas from flowing into the air intake opening 80*a*. In other words, while the gas passage 100 is formed to cause the gaseous component to flow in the lateral direction (horizontal direction) from the inlet opening 74*b* toward the air acquisition opening 78*a*, the liquid passage 102 is formed in the floor portion 120*a* in the vicinity of the second flow pipe 74 and reaches the air acquisition opening 78*a*.

The breather apparatus 10B configured in the manner described above causes the blowby gas to flow into the chassis 120 from the inlet opening 74*b* of the second flow pipe 74. At this time, the blowby gas contacts the ceiling portion 120*b* of the chassis 120, causing the moisture to stick thereto. Furthermore, when the blowby gas moves from the inlet opening 74*b* of the second flow pipe 74 to the air intake opening 80*a*, it is possible for the moisture to fall downward. When the moisture falls to the floor portion 120*a*, the moisture moves along the floor portion 120*a* and is discharged from the air acquisition opening 78*a*.

The external air flows in from the air acquisition opening 78*a* and mixes with the gaseous component of the blowby gas, and flows into the air intake opening 80*a* as mixed air. The dividing wall 122 forms an obstacle for the rising external air, and even if the moisture discharged by the liquid passage 102 were to mix with the external air, the moisture would be prevented from flowing into the air intake opening 80*a*.

As described above, with the breather apparatus 10B according to the third embodiment as well, it is possible to prevent the moisture in the blowby gas from entering into the air intake opening 80*a*, in the same manner as in the breather apparatuses 10 and 10A according to the first and second embodiments. In particular, the breather apparatus 10B can adopt a simple structure, and therefore it is possible to reduce the manufacturing cost of the apparatus.

The invention claimed is:

1. A breather apparatus comprising:
- a flow portion through which blowby gas of an engine flows;
- a chassis into which the blowby gas that has flowed through the flow portion flows;
- an outflow opening through which gas flows out from inside the chassis; and
- a gas-liquid separation mechanism that separates moisture included in the blowby gas, wherein
- the gas-liquid separation mechanism separates the outflow opening and an inflow opening through which the blowby gas flows in from the flow portion from each other by a prescribed distance and has the outflow opening arranged farther upward than a fluid passage through which the moisture flows, and
- the gas-liquid separation mechanism includes a gas passage through which the blowby gas flows to the outlet opening from the inlet opening without passing through an air cleaner element, wherein
- the gas-liquid separation mechanism comprise
  - an inflow gas-liquid separation mechanism that separates the moisture while the blowby gas is guided to the inside of the chassis from the flow section and
  - an outflow gas-liquid separation mechanism that separates the moisture while the blowby gas is guided to the outlet opening from the chassis.

2. The breather apparatus according to claim 1, wherein the inflow gas-liquid separation mechanism includes an inflow member that is provided between the flow portion and the chassis and guides the blowby gas from the flow portion to the inside of the chassis.

3. The breather apparatus according to claim 2, wherein the inflow member includes a blocking wall that blocks the flow of the moisture to the outflow opening.

4. The breather apparatus according to claim 3, wherein the inflow member includes a guide space that is provided inside the chassis and causes the blowby gas to flow in a direction different from the direction in the gas passage that is toward the outflow opening.

5. The breather apparatus according to claim 4, wherein the inflow member includes a protruding portion that protrudes into the guide space and causes the blowby gas to flow out toward a wall portion that forms the guide space from the flow portion.

6. The breather apparatus according to claim 2, wherein the inflow member is attached to an outer side of the chassis and takes in external air and causes the external air to flow to the chassis along with the blowby gas, a flow space from the inflow opening to a through-hole that penetrates through the chassis is formed with a zigzag shape, and the liquid passage is in communication with the flow space.

7. The breather apparatus according to claim 1, wherein the outflow gas-liquid separation mechanism is a protruding portion having the outflow opening arranged at a position higher than a floor surface of the chassis.

8. The breather apparatus according to claim 1, wherein the gas-liquid separation mechanism includes a groove portion through which the moisture is discharged to the outside of the chassis.

9. The breather apparatus according to claim 1, wherein the gas-liquid separation mechanism is configured such that the flow section is shaped as a pipe and protrudes from a floor portion of the chassis toward a ceiling portion and the inflow opening opposes the ceiling portion.

10. The breather apparatus according to claim 1, wherein the chassis includes an intake opening that takes in external air, mixes the external air with the blowby gas, and guides the resulting mixed gas to the outflow opening.

11. A snow removal machine comprising:
a breather apparatus including:
a flow portion through which blowby gas of an engine flows;
a chassis into which the blowby gas that has flowed through the flow portion flows;
an outflow opening through which gas flows out from inside the chassis; and
a gas-liquid separation mechanism that separates moisture included in the blowby gas, wherein
the gas-liquid separation mechanism separates the outflow opening and an inflow opening through which the blowby gas flows in from the flow portion from each other by a prescribed distance and has the outflow opening arranged farther upward than a fluid passage through which the moisture flows, and
the gas-liquid separation mechanism includes a gas passage through which the blowby gas flows to the outlet opening from the inlet opening without passing through an air cleaner element; and
an engine, wherein
the gas-liquid separation mechanism comprises
an inflow gas-liquid separation mechanism that separates the moisture while the blowby gas is guided to the inside of the chassis from the flow section and
an outflow gas-liquid separation mechanism that separates the moisture while the blowby gas is guided to the outlet opening from the chassis.

* * * * *